(12) United States Patent
Huber

(10) Patent No.: US 10,608,506 B2
(45) Date of Patent: Mar. 31, 2020

(54) METHOD FOR COOLING A GENERATOR

(71) Applicant: Siemens Aktiengesellschaft, Munich (DE)

(72) Inventor: Norbert Huber, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 338 days.

(21) Appl. No.: 15/544,627

(22) PCT Filed: Jan. 6, 2016

(86) PCT No.: PCT/EP2016/050104
§ 371 (c)(1),
(2) Date: Jul. 19, 2017

(87) PCT Pub. No.: WO2016/120026
PCT Pub. Date: Aug. 4, 2016

(65) Prior Publication Data
US 2018/0006530 A1   Jan. 4, 2018

(30) Foreign Application Priority Data
Jan. 26, 2015 (EP) .................................. 15152508

(51) Int. Cl.
*H02K 9/10* (2006.01)
*H02K 9/08* (2006.01)
*H02K 9/14* (2006.01)

(52) U.S. Cl.
CPC ................. *H02K 9/10* (2013.01); *H02K 9/08* (2013.01); *H02K 9/14* (2013.01)

(58) Field of Classification Search
CPC ................................... H02K 9/10; H02K 9/19
USPC ............ 310/52, 54, 55, 58, 61, 64; 290/1 B; 29/596
See application file for complete search history.

(56) References Cited

U.S. PATENT DOCUMENTS

| | | | | |
|---|---|---|---|---|
| 6,731,017 B2 * | 5/2004 | Mikhall | .................... | F16H 1/22 290/1 C |
| 2005/0035673 A1 * | 2/2005 | Lafontaine | ............. | H02K 1/187 310/58 |
| 2005/0194847 A1 * | 9/2005 | Gromoll | ................... | H02K 9/14 310/54 |
| 2006/0059937 A1 | 3/2006 | Perkins et al. | | |
| 2007/0063594 A1 | 3/2007 | Huynh | | |
| 2010/0176600 A1 * | 7/2010 | Pabst | ..................... | H02K 1/278 290/55 |
| 2013/0136629 A1 | 5/2013 | Maier | | |
| 2013/0270937 A1 | 10/2013 | Rasmussen | | |

FOREIGN PATENT DOCUMENTS

| | | |
|---|---|---|
| CN | 103208883 A | 7/2013 |
| DE | 102010033942 A1 | 12/2011 |
| DE | 102012022421 A1 | 5/2014 |
| EP | 1612916 A1 | 1/2006 |
| GB | 334473 A | 9/1930 |
| JP | H0847210 A | 2/1996 |
| JP | 2003092857 A | 3/2003 |
| JP | 2005054779 A | 3/2005 |
| JP | 2006087295 A | 3/2006 |

OTHER PUBLICATIONS

EP Search Report dated Aug. 4, 2015, for EP patent application No. 15152508.6.
International Search Report dated Mar. 15, 2016, for PCT/EP2016/050104.

* cited by examiner

*Primary Examiner* — Hanh N Nguyen
(74) *Attorney, Agent, or Firm* — Beusse Wolter Sanks & Maire

(57) ABSTRACT

A method for cooling a generator using cooling air flowing through the generator, wherein a density of the cooling air when the generator is idling and running passively at a mains frequency of a mains network to which the generator is connected is reduced relative to a density of the cooling air when the generator is operating under load.

4 Claims, No Drawings

METHOD FOR COOLING A GENERATOR

CROSS REFERENCE TO RELATED APPLICATIONS

This application is the US National Stage of International application Ser. No. PCT/EP2016/050104 filed Jan. 6, 2016, and claims the benefit thereof. The International Application claims the benefit of European application Ser. No. EP15152508 filed Jan. 26, 2015. All of the applications are incorporated by reference herein in their entirety.

FIELD OF INVENTION

The invention relates to a method for cooling a generator using a cooling medium flowing through the generator.

BACKGROUND OF INVENTION

Large power plant generators, in particular in the form of turbine generators, typically have a 99% degree of efficiency. This means that only 1% of the mechanical output is not converted into electric current but into heat, which needs to be removed from a generator using special cooling measures in order not to exceed preset maximum temperatures.

As the decentralized generation of renewable energy becomes increasingly widespread, so-called phase shift generators are needed which sometimes, in load mode, convert reactive power into active power and sometimes, in idle mode, rotate only passively at a grid frequency of a grid to which they are connected.

Axial fans, which are arranged on a shaft of a turbine generator and supply a flow of cooling air, are conventionally used to cool or ventilate the inside of turbine generators. The losses of such a turbine generator can be divided into electrical losses, in particular ohmic losses and eddy current losses, into air friction losses due to the rotation of rotor components of the turbine generator, especially in a gap between the rotor components and stator components of the turbine generator, and into air circulation losses as a result of the volume flow of cooling air to be generated.

When a turbine generator is in idle mode, although the electrical losses are reduced by the ohmic losses in the stator of the turbine generator, air friction losses and air circulation losses remain in the case of turbine generators with internal ventilation and then drop off significantly in intensity owing to the lack of power consumption. The volume flow of air required for cooling in idle mode can be significantly less.

The air friction losses can be estimated (cf Bohl, Elmendorf: Technische Strömungslehre [Technical Fluid Mechanics]) using the following equation:

$$\dot{Q}=C_M*\rho/2*\omega^3*R^5.$$

Where the loss of power Q increases with the fifth power of the radius R and the third power of the angular velocity $\omega$ and is proportional to the air density $\rho$ of the cooling medium, which is usually air. $C_M$ is a coefficient of friction. The air circulation losses likewise increase with the density of the cooling medium.

In the case of a rotating electrical machine, instead of internal ventilation external ventilation can be used for cooling which can be achieved independently of the speed or load of the rotating electrical machine but requires additional components.

Air-cooled generators can be achieved up to a power output of approximately 400 MW, and in this case air friction dominates. In the case of larger generators, they are then usually cooled using hydrogen as the cooling medium, which places higher demands on the leak tightness of a housing of a generator and on security.

SUMMARY OF INVENTION

According to the invention, the air friction losses can be reduced by a lower density of the cooling air at least temporarily when the generator is in idle mode, i.e. when lower heat removal is required. Consequently, a lower power demand can be achieved and cooling ensured in idle mode without there being any need for additional components such as, for example, external fans. This is associated, in particular in the case of idle phases with a higher period of time, with a significant increase in the overall efficiency of the generator.

The density of the cooling air can also be reduced correspondingly during the whole idle mode relative to the density of the cooling air in a load mode of the generator.

The density of the cooling air is reduced in the idle mode by increasing the humidity of the cooling air. When cooling air is used, because water has a low molecular weight, the density of the cooling air can be reduced, the cooling air being moistened by the water. In load mode of the generator, such an increase in the humidity of the cooling air is not possible because of a dielectric strength which needs to be maintained.

The density of the cooling air in idle mode is reduced by at least partially replacing the cooling air with nitrogen. Pure nitrogen has a lower density than air. The more air that is replaced with nitrogen, the lower the density of the cooling air formed. In this embodiment, the generator must be cooled with a closed circuit in which the cooling air circulates. A housing of the generator must be sealed for this purpose. A metering device for introducing the nitrogen can be present, it also being possible for subsequent metering of nitrogen to take place. The cooling air which is at least partially enriched with nitrogen can also be used for cooling during a subsequent load mode of the generator in order also to reduce air friction losses in load mode.

The density of the cooling air in idle mode is reduced by at least partially replacing the cooling air with hydrogen below a lower flammability limit. As a result, cooling of the generator with low air friction can take place in idle mode but also in a subsequent load mode of the generator. In addition, there is no need for any expensive sealing and safety measures because the lower flammability limit is not reached.

The density of the cooling air in idle mode is advantageously reduced by increasing a recooling temperature which is used to recool the cooling air. Here in idle mode of the generator, a recooling temperature which is increased relative to the recooling temperature required in load mode of the generator is used instead of the latter, and this causes a reduction in the temperature of the cooling air and hence a lower density of the cooling air. The increase in the recooling temperature can be effected, for example, by a higher flow velocity of a cooling fluid in a recooling circuit or by other measures for increasing the performance of the latter.

The density of the cooling air in idle mode is advantageously reduced by creating a reduced pressure inside a housing of the generator. As a result, air friction losses in idle mode, but also in a subsequent load mode of the generator, can be reduced. However, the heat removal capacity of the cooling air is lowered as a result.

DETAILED DESCRIPTION OF INVENTION

The above described embodiments of the method can be employed individually or in any desired combination or subcombination with one another in order to reduce the density of the cooling air.

The invention claimed is:

1. A method for cooling a generator using cooling air flowing through the generator, comprising:
    reducing a density of a cooling air in idle mode of the generator, in which the generator rotates passively at a grid frequency of a grid to which the generator is connected, relative to the density of the cooling air in load mode of the generator;
    wherein a density of a cooling medium in idle mode is reduced by increasing a moisture of the cooling medium,
    wherein the density of the cooling air in idle mode is reduced by at least partially replacing the cooling air with nitrogen;
    wherein the density of the cooling air in idle mode is reduced by at least partially replacing the cooling air with hydrogen below a lower ignition threshold.

2. The method as claimed in claim 1,
    wherein the density of the cooling air in idle mode is reduced by increasing a recooling temperature which is used to recool the cooling air.

3. The method as claimed in claim 2,
    wherein the density of the cooling air in idle mode is reduced by creating a reduced pressure inside a housing of the generator.

4. The method as claimed in claim 1,
    wherein the density of the cooling air in idle mode is reduced by creating a reduced pressure inside a housing of the generator.

* * * * *